United States Patent
Yun et al.

(10) Patent No.: US 8,331,599 B2
(45) Date of Patent: Dec. 11, 2012

(54) SPEAKER DEVICE FOR MOBILE TERMINAL

(75) Inventors: Heung-Sik Yun, Gumi-si (KR);
Byeong-Kuk Lee, Daegu (KR);
Joon-Woo Lim, Suwon-si (KR);
Do-Hwan Kim, Hwaseong-si (KR)

(73) Assignees: Samsung Electronics Co., Ltd.,
Gyeonggi-do (KR); Kwangwon Tech Co., Ltd., Gyeonggi-do (KR)

( * ) Notice: Subject to any disclaimer, the term of this patent is extended or adjusted under 35 U.S.C. 154(b) by 1139 days.

(21) Appl. No.: 11/603,192

(22) Filed: Nov. 22, 2006

(65) Prior Publication Data

US 2008/0025547 A1  Jan. 31, 2008

(30) Foreign Application Priority Data

Jul. 28, 2006 (KR) .................................. 2006-71447

(51) Int. Cl.
*H04R 1/02* (2006.01)
(52) U.S. Cl. ........................................ 381/345; 381/388
(58) Field of Classification Search .................. 381/345, 381/349, 351, 386, 337; 181/198, 199
See application file for complete search history.

(56) References Cited

U.S. PATENT DOCUMENTS

| | | | | |
|---|---|---|---|---|
| 4,239,945 A | * | 12/1980 | Atoji et al. | .................. 381/371 |
| 6,389,145 B2 | * | 5/2002 | Baumhauer et al. | .......... 381/345 |
| 2001/0012371 A1 | | 8/2001 | Baumhauer, Jr. | |
| 2003/0096632 A1 | | 5/2003 | Kim | |
| 2005/0190941 A1 | * | 9/2005 | Yang | ............................. 381/351 |

FOREIGN PATENT DOCUMENTS

| | | |
|---|---|---|
| CN | 1404341 | 3/2003 |
| EP | 1389032 | 2/2004 |
| EP | 1599065 | 11/2005 |
| GB | 1579983 | 11/1980 |
| KR | 1020050094701 | 9/2005 |
| KR | 1020060034355 | 4/2006 |
| KR | 1020060060410 | 6/2006 |
| KR | 1020070028133 | 3/2007 |

\* cited by examiner

*Primary Examiner* — Curtis Kuntz
*Assistant Examiner* — Sunita Joshi
(74) *Attorney, Agent, or Firm* — Roylance, Abrams, Berdo & Goodman, L.L.P.

(57) ABSTRACT

A speaker device for use in a mobile terminal includes a speaker frame with a speaker unit mounted therein, and a frame cover provided at the rear side of the speaker frame to form a resonance space between the speaker frame and the frame cover. Sound that is output in a forward direction of the speaker unit is emitted to a front space of the speaker frame, and sound that is output to the rear of the speaker unit is emitted through the resonance space. The speaker device provides the resonance space at the rear side of the speaker frame to reinforce the output of midrange and bass tones, thereby reproducing the original sound as accurately as possible. The speaker device enables a user to enjoy vivid sound when reproducing a multimedia file or viewing a digital, multimedia broadcast (DMB) program on a small-sized device, such as a mobile terminal.

32 Claims, 3 Drawing Sheets

SPEAKER DEVICE FOR MOBILE TERMINAL

CROSS-REFERENCE TO RELATED APPLICATION

This application claims the benefit under 35 U.S.C. §119(a) of an application entitled "Speaker Device for Mobile Terminal" filed with the Korean Intellectual Property Office on Jul. 28, 2006 and assigned Serial No. 2006-71447, the entire disclosure of which is hereby incorporated by reference.

BACKGROUND OF THE INVENTION

1. Field of the Invention

The present invention relates to a mobile terminal. More particularly, the present invention relates to a speaker device for a mobile terminal that improves the sound pressure level, articulation and acoustic distortion rate of output sound, and reinforces output of midrange and bass tones to reproduce the original sound as accurately as possible.

2. Description of the Related Art

Generally, mobile terminals refer to handheld devices used for wireless communications between users or between a user and a service provider through a base station. Mobile terminals can offer various functions or services, including voice communication, short message service, mobile banking, TV broadcasts, online games, video-on-demand and various content transmissions.

Mobile terminals can be classified into a bar type, a flip type and a folder type according to their shapes. A bar-type mobile terminal has a single housing provided with data input/output means such as a communication circuit, a microphone and an earpiece. A flip-type mobile terminal has a bar-shaped housing and a flip cover rotatably connected to the housing. A folder-type mobile terminal has a pair of housings rotatable about each other and having input/output means properly distributed thereon. Recently, new designs with improved portability and convenience, such as a slide type, have been launched to meet the diverse needs and tastes of users.

Mobile terminals have gone beyond merely being telephones or short message devices, and now integrate additional functions, such as games, music, motion picture file transmission, multimedia services and digital multimedia broadcasting ("DMB") services.

Even before the commercialization of multimedia and DMB services, a thin film transistor ("TFT"), instead of a monochromatic liquid crystal display device, was used for a display unit of a mobile terminal to produce high-quality color pictures. The TFT display unit has a high capacity sufficient to offer multimedia and DMB services to the mobile users.

To provide a speaker device suitable for the multimedia and DMB services, a conventional mobile terminal includes additional speaker units for outputting stereo sound, as well as a speaker unit for outputting a received voice or a bell sound.

However, such additional speaker units cannot fully exert their capacity due to the limited space within a mobile terminal. The limited space reduces the sound pressure output and articulation level, and increases the acoustic distortion rate. Because the speaker units are mounted in the limited space of the mobile terminal, the sound output from the speaker units cannot be accurately reproduced in the low bass range, which does not meet the users' need to enjoy the original sound reproduced as accurately as possible when using multimedia services or viewing DMB programs.

Accordingly, a need exists for an improved speaker device that accurately reproduces sound in a compact mobile terminal.

SUMMARY OF THE INVENTION

An object of exemplary embodiments of the present invention is to provide a speaker device mounted within a mobile terminal capable of accurately reproducing bass tones.

Another object of the present invention is to provide a speaker device for a mobile terminal that enhances bass tones to reproduce the original sound as accurately as possible during multimedia or DMB services.

A speaker device for use in a mobile terminal includes a speaker frame with a speaker unit mounted therein, and a frame cover provided at the rear side of the speaker frame to form a resonance space between the speaker frame and the frame cover. Sound that is output in a forward direction of the speaker unit is emitted to a front space of the speaker frame, and sound that is output to the rear of the speaker unit is emitted through the resonance space.

Other objects, advantages and salient features of the invention will become apparent from the following detailed description, which, taken in conjunction with the annexed drawings, discloses exemplary embodiments of the invention.

BRIEF DESCRIPTION OF THE DRAWINGS

The above and other objects, features and advantages of the present invention will be more apparent from the following detailed description taken in conjunction with the accompanying drawings, in which.

Throughout the drawings, the same drawing reference numerals will be understood to refer to the same elements, features, and structures.

DETAILED DESCRIPTION OF EXEMPLARY EMBODIMENTS

Hereinafter, exemplary embodiments of the present invention are described with reference to the accompanying drawings. Descriptions of well-known functions and constructions thereof are omitted for clarity and conciseness.

Figure 1:
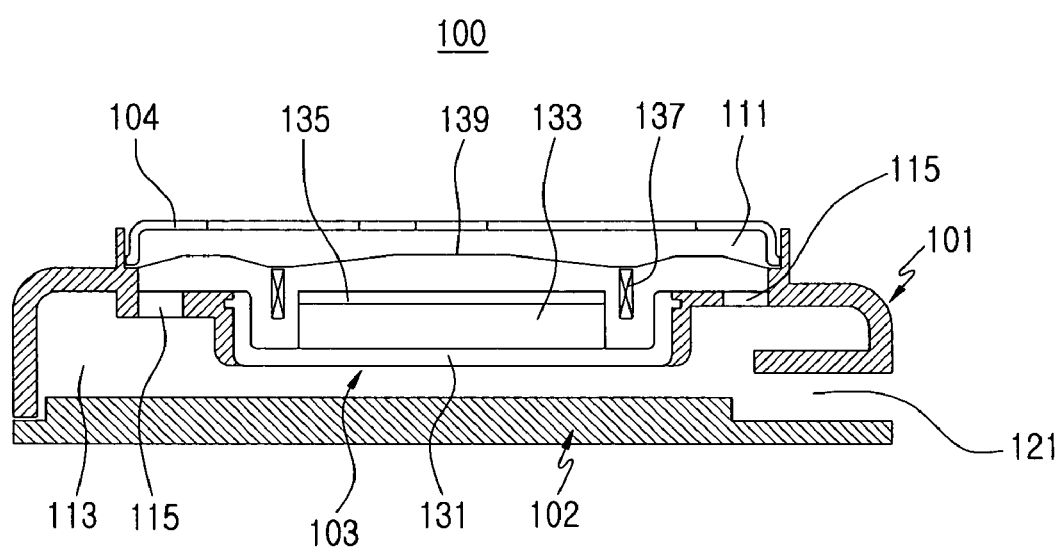
FIG. 1 is an elevational view in partial cross section of a speaker device for a mobile terminal according to an exemplary embodiment of the present invention.

FIG. 1 is an elevational view in partial cross section of a speaker device 100 for a mobile terminal according to an exemplary embodiment of the present invention. As illustrated in FIG. 1, the speaker device 100 includes a speaker unit 103 within a speaker frame 101 and a frame cover 102 provided at the rear side of the speaker frame 101 to form a resonance space 113 between the rear surface of the speaker frame 101 and the frame cover 102.

More specifically, the speaker unit 103 is mounted at the center part of the speaker frame 101. The speaker frame 101 has a front space 111 protected by a protector 104. The frame cover 102 is provided at the rear side of the speaker frame 101. The front space 111 of the speaker frame 101 and the resonance space 113 are separated by a yoke 131 of the speaker unit 103. The front space 111 and the resonance space 113 are connected through at least one vent hole 115.

The speaker frame 101 is preferably injection molded. The resonance space 113 having one side opened is formed when the frame cover 102 is coupled to the rear side of the speaker frame 101. Preferably, the frame cover 102 has a substantially flat-plate shape.

The speaker unit 103 includes a yoke 131, a magnetic member 133, a voice coil 137 and a vibration plate 139. The yoke 131 is placed at approximately the center of the speaker frame 101 to separate the front space 111 of the speaker frame 101 from the resonance space 113 formed at the rear side of the speaker frame 101. The magnetic member 133 is attached to the front surface of the yoke 131 and is surrounded by the voice coil 137. The vibration plate 139 is provided on the front surface of the voice coil 137 so that the vibration plate faces the magnetic member 133 and the voice coil 137.

When an electric signal, such as an audio signal, is applied to the speaker unit 103, an electric field generated from the voice coil 137 and a magnetic field of the magnetic member 133 interact to vibrate the vibration plate 139, thereby generating sound corresponding to the applied signal. A metallic plate 135 provided on the front surface of the magnetic member 133 induces the magnetic field to be distributed toward the voice coil 137, which facilitates vibration of the vibration plate 139 by the applied signal.

The protector 104 is mounted at the front side of the speaker frame 101 to protect the speaker unit 103. The protector 104 also allows sound generated from the speaker unit 103 to be emitted outwardly. Sound generated from the speaker unit 103 is emitted through the protector 104 in a forward direction of the speaker device 100. However, sound output to the rear of the speaker unit is emitted in a backward direction, that is, through the resonance space 113.

In a conventional speaker device having no resonance space 113, sound emitted to the rear of a speaker unit leaks outside a mobile terminal, without being transferred to the user. To the contrary, in the speaker device 100 according to an exemplary embodiment of the present invention, sound traveling to the rear of the speaker unit 103 causes resonance within the resonance space 113, thereby reinforcing production of midrange and bass tones and reproducing the original sound as accurately as possible.

The speaker device 100 may additionally include a duct hole 121 for connecting the resonance space 113 to the outside of the speaker frame 101. The duct hole 121 is preferably formed between the resonance space 113 and an outer surface of the speaker device 100, as shown in FIG. 1. The duct hole 121 allows the sound output to the rear of the speaker unit 103 to be emitted outside after causing resonance within the resonance space 113. The duct hole 121 substantially prevents the consecutively output waves of sound from interfering each another. When the resonance space 113 is formed large enough to prevent a sound wave output to the rear of the speaker unit 103 from interference from a subsequent sound wave after causing resonance, the duct hole 121 may be omitted. Preferably, the duct hole 121 is formed at a portion extending rearwardly from the speaker frame 101.

The speaker device according to exemplary embodiments of the present invention is applicable to a slim and small-sized mobile terminal. Because the speaker device has a limitation in providing a resonance space large enough to substantially prevent interference between sound waves, the speaker device preferably includes the duct hole 121.

Figure 2:
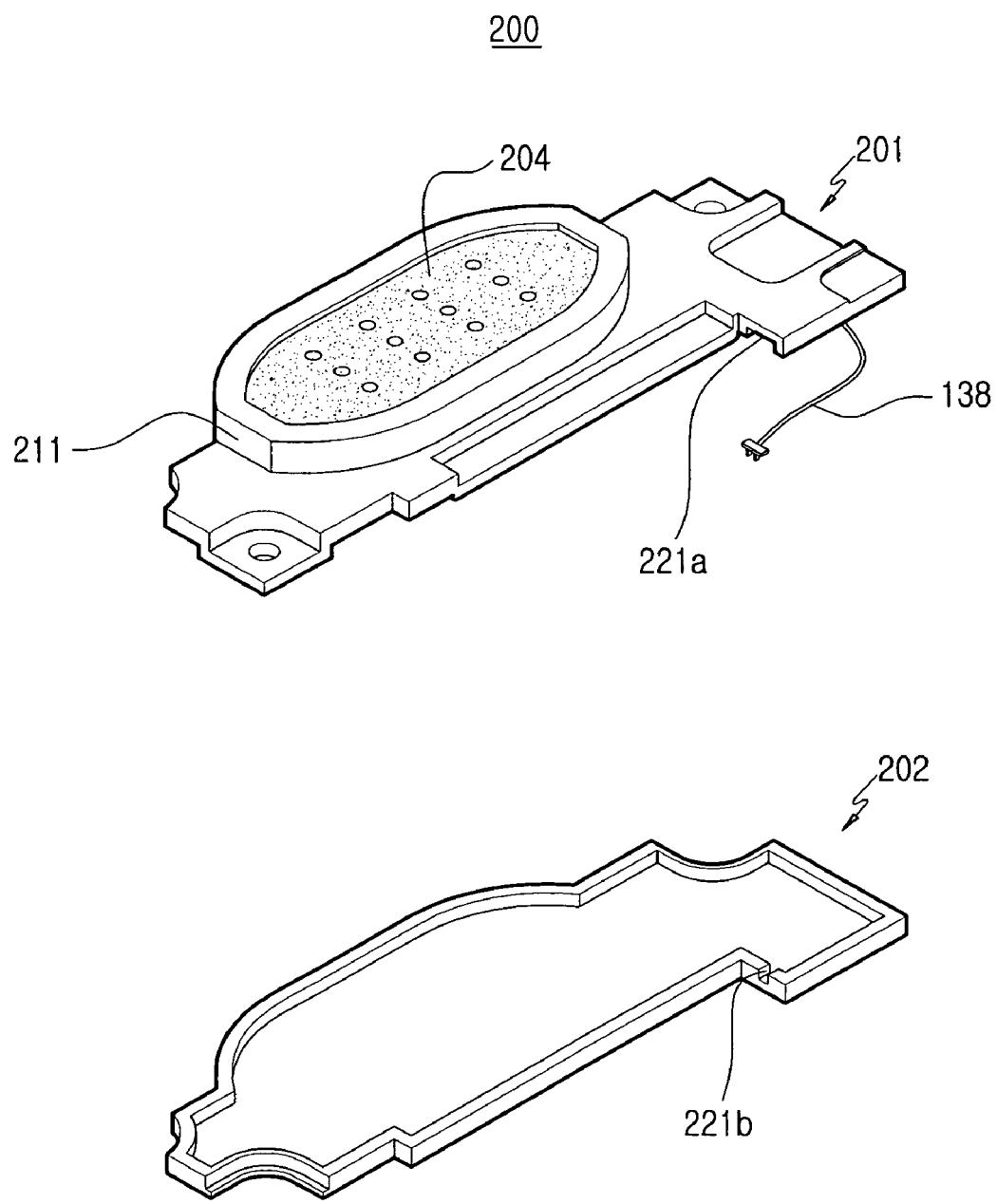
FIG. 2 is an exploded perspective view of a speaker device with the resonance structure illustrated in FIG. 1.
Figure 3:
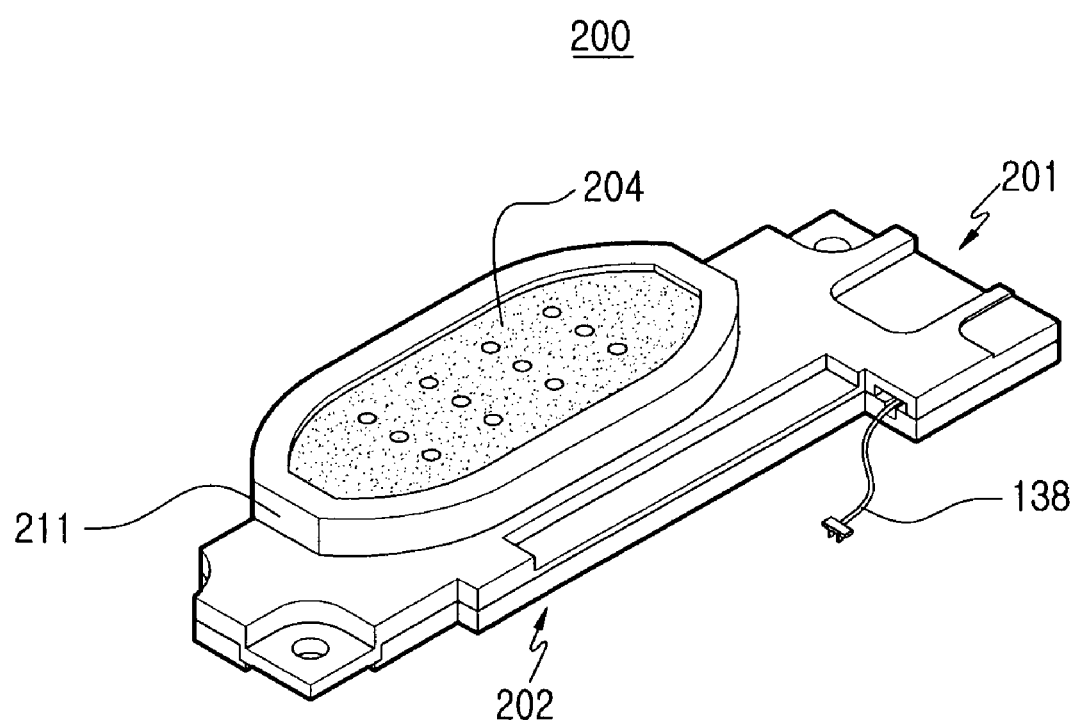
FIG. 3 is an assembled perspective view of the speaker device of FIG. 2.

FIG. 2 is an exploded perspective view of a speaker device 200 having the resonance structure illustrated in FIG. 1. FIG. 3 is an assembled perspective view of the speaker device 200 of FIG. 2. As illustrated in FIGS. 2 and 3, the speaker device 200 having the resonance structure according to exemplary embodiments of the present invention includes a speaker frame 201 with a speaker unit (not shown) mounted therein and a frame cover 202 provided at the rear side of the speaker frame 201. Drawing reference numerals or detailed explanations of the elements that are easily understandable in view of the speaker device of FIG. 1 are omitted in the following description.

The speaker frame 201 has a protruded portion 211 at the front surface thereof. A protector 204 is provided inside the protruded portion 211. The speaker unit 200 is mounted within a space formed by the protruded portion 211 and the protector 204.

The frame cover 204 is provided at the rear side of the speaker frame 201 to form a resonance space. The speaker frame 201 and the frame cover 202 have grooves 221a and 221b for forming a duct hole. When the frame cover 202 is coupled to the speaker frame 201, the grooves 221a and 221b face each other and form a duct hole.

While the duct hole illustrated in FIG. 1 extends from the resonance space 113 and backwardly outward from the speaker frame 101, the duct hole actually applied to a product as illustrated in FIGS. 2 and 3 may be formed in a portion extending in a horizontal direction of the speaker frame 201. The duct hole opens toward an axis through a center of the speaker device 200, as shown in FIGS. 2 and 3. The duct hole that connects the resonance space to the outside of the speaker frame 201 is formed in a portion extending horizontally from the speaker frame 201 so that the sound causing resonance within the resonance space may be emitted laterally from the speaker frame 201.

A signal cable 138 extending from the speaker unit applies an audio signal to the speaker unit. The signal cable 138 reaches outside the speaker frame through the duct hole.

In the speaker device 200 having the above structure, sound emitted to the rear of the speaker unit causes resonance within the resonance space, thereby reinforcing production midrange and bass tones and reproducing the original sound as accurately as possible.

As explained above, the speaker device according to exemplary embodiments of the present invention provides the resonance space at the rear side of the speaker frame to reinforce the output of midrange and bass tones, thereby reproducing the original sound as accurately as possible. The speaker device enables a user to enjoy vivid sound when reproducing a multimedia file or viewing a DMB program on a small-sized device, such as a mobile terminal.

Although exemplary embodiments of the present invention have been described for illustrative purposes, those skilled in the art will appreciate that various modifications, additions and substitutions are possible, without departing from the scope and spirit of the invention as disclosed in the accompanying claims, including the full scope of equivalents thereof.

What is claimed is:

1. A speaker device for use in a mobile terminal, comprising:
   a speaker frame with a speaker unit mounted therein; and
   a frame cover provided at the rear side of the speaker frame to form a resonance space between the speaker frame and the frame cover,
   wherein sound output in a forward direction of the speaker unit is emitted to a front space of the speaker frame, and sound output to the rear of the speaker unit is emitted through the resonance space such that the sound output in the forward direction is emitted externally of the speaker device through a first outer surface after passing through the front space and the sound output to the rear of the speaker unit is emitted externally of the speaker device through a second outer surface after passing through the resonance space through a duct hole formed between the speaker frame and the frame cover, wherein the front space and the resonance space are separated by a yoke of the speaker unit.

2. The speaker device according to claim 1, further comprising at least one vent hole connecting the front space of the speaker frame and the resonance space.

3. The speaker device according to claim 1, further comprising at least one signal cable extending from the speaker unit and passing through the duct hole.

4. The speaker device according to claim 1, wherein the speaker unit comprises
the yoke disposed approximately at the center of the speaker frame;
a magnetic member attached to the front surface of the yoke and placed in the front space of the speaker frame;
a voice coil disposed around the magnetic member; and a vibration plate disposed in the front space of the speaker frame such that the vibration plate faces the magnetic member and the voice coil.

5. The speaker device according to claim 4, further comprising a protector mounted at the front side of the speaker frame to protect the speaker unit.

6. The speaker device according to claim 4, wherein the speaker unit further comprises a metallic plate disposed on the front surface of the magnetic member to induce a magnetic field to be distributed toward the voice coil.

7. The speaker device according to claim 1, wherein the frame cover has a substantially flat-plate shape.

8. The speaker device according to claim 1, wherein the speaker frame is injection molded and the resonance space has one open side formed by coupling the frame cover to the rear side of the speaker frame.

9. The speaker device according to claim 1, wherein the speaker frame and the frame cover have grooves that face each other and form the duct hole when the frame cover is coupled to the speaker frame.

10. The speaker device according to claim 1, wherein the duct hole is formed at a portion extending in a horizontal direction of the speaker frame.

11. A speaker device for use in a mobile terminal, comprising:
a speaker frame with a speaker unit mounted therein, and a front space being formed in the speaker frame;
a frame cover connected to the speaker frame to form a resonance space between the speaker frame and the frame cover;
a vent hole in the speaker frame to connect the front space to the resonance space; and
a duct hole formed between the resonance space and a second outer surface of the speaker device, the duct hole being formed between the speaker frame and the frame cover;
wherein sound output in a first direction is emitted to the front space of the speaker frame, and sound output in a second and substantially opposite direction is emitted through the resonance space such that the sound output in the first direction is emitted externally of the speaker device through a first outer surface after passing through the front space and the sound output in the second direction is emitted externally of the speaker device through the duct hole in the second outer surface after passing through the resonance space,
wherein the front space and the resonance space are separated by a yoke of the speaker unit.

12. The speaker device according to claim 11, wherein a signal cable extends from the speaker unit and passes through the duct hole.

13. The speaker device according to claim 11, wherein the speaker unit includes
the yoke disposed approximately at the center of the speaker frame;
a magnetic member attached to the front surface of the yoke and disposed in the front space of the speaker frame;
a voice coil disposed around the magnetic member; and
a vibration plate disposed in the front space of the speaker frame such that the vibration plate faces the magnetic member and the voice coil.

14. The speaker device according to claim 13, wherein a protector is secured to the speaker frame to protect the speaker unit.

15. The speaker device according to claim 13, wherein a metallic plate is disposed on the front surface of the magnetic member to induce a magnetic field to be distributed toward the voice coil.

16. The speaker device according to claim 11, wherein the frame cover has a substantially flat-plate shape.

17. The speaker device according to claim 11, wherein speaker frame is injection molded and the resonance space has one open side formed by coupling the frame cover to the rear side of the speaker frame.

18. The speaker device according to claim 11, wherein the speaker frame and the frame cover have grooves that face each other to form the duct hole when the frame cover is coupled to the speaker frame.

19. The speaker device according to claim 11, wherein the duct hole is formed such that the duct hole opens toward an axis through a center of the speaker device.

20. A speaker device for use in a mobile terminal, comprising:
a front space;
a resonance space separated from the front space; and
a speaker unit to emit sound such that sound output in a first direction is emitted to the front space, and sound output in a second and substantially opposite direction is emitted through the resonance space and such that the sound output in the first direction is emitted externally of the speaker device through a first outer surface after passing through the front space and the sound output in the second direction is emitted externally of the speaker device through a second outer surface after passing through the resonance space through a duct hole formed between the speaker frame and the frame cover,
wherein the front space and the resonance space are separated by a yoke of the speaker unit.

21. The speaker device according to claim 20, wherein the speaker unit is mounted in a speaker frame.

22. The speaker device according to claim 21, wherein the front space is formed in the speaker frame.

23. The speaker device according to claim 22, wherein a frame cover is connected to the speaker frame such that the resonance space is formed between the speaker frame and the frame cover.

24. The speaker device according to claim 23, wherein a vent hole in the speaker frame connects the front space to the resonance space.

25. The speaker device according to claim 20, wherein a signal cable extends from the speaker unit and passes through the duct hole.

26. The speaker device according to claim 23, wherein the speaker unit includes the yoke disposed approximately at the center of the speaker frame;

a magnetic member attached to the front surface of the yoke and disposed in the front space of the speaker frame;

a voice coil disposed around the magnetic member; and a vibration plate disposed in the front space of the speaker frame such that the vibration plate faces the magnetic member and the voice coil.

27. The speaker device according to claim 23, wherein a protector is secured to the speaker frame to protect the speaker unit.

28. The speaker device according to claim 26, wherein a metallic plate is disposed on the front surface of the magnetic member to induce a magnetic field to be distributed toward the voice coil.

29. The speaker device according to claim 23, wherein the frame cover has a substantially flat-plate shape.

30. The speaker device according to claim 23, wherein the speaker frame is injection molded and the resonance space has one open side formed by coupling the frame cover to the rear side of the speaker frame.

31. The speaker device according to claim 23, wherein the speaker frame and the frame cover have grooves that face each other to form a duct hole when the frame cover is coupled to the speaker frame.

32. The speaker device according to claim 20, wherein the duct hole is formed such that the duct hole opens toward an axis through a center of the speaker device.

* * * * *